United States Patent [19]

Roos et al.

[11] Patent Number: 5,783,232

[45] Date of Patent: Jul. 21, 1998

[54] BLOW MOLDING MACHINE USING REHEAT METHOD FOR PRODUCING HOLLOW PLASTIC ARTICLES

[75] Inventors: Uwe-Volker Roos, Bodenteich; Gottfried Mehnert, Berlin; Franz Gittner, Soltendieck, all of Germany

[73] Assignee: Bekum Maschinenfabriken GmbH, Germany

[21] Appl. No.: 767,842

[22] Filed: Dec. 18, 1996

[51] Int. Cl.⁶ ................................ B29L 49/64
[52] U.S. Cl. ............ 425/526; 264/535; 264/538; 425/534
[58] Field of Search .................. 425/526, 533, 425/534; 264/535, 538

[56] References Cited

U.S. PATENT DOCUMENTS

| | | | |
|---|---|---|---|
| 3,850,566 | 11/1974 | Moore | 425/534 |
| 4,354,813 | 10/1982 | Collombin | 425/534 |
| 4,479,772 | 10/1984 | Kleimenhagen | 425/534 |
| 4,767,311 | 8/1988 | Gibbemeyer | 425/534 |
| 5,110,282 | 5/1992 | Voss | 425/534 |
| 5,308,233 | 5/1994 | Denis et al. | 425/526 |
| 5,516,274 | 5/1996 | Maggert | 425/534 |

*Primary Examiner*—Robert Davis
*Attorney, Agent, or Firm*—Juettner Pyle Piontek & Underwood

[57] ABSTRACT

To be able to guide the parisons in a reheat type blow molding machine having separate heat and blow paths along the path where they are heated up to blow temperature, i.e., in narrowly spaced relationship past the heating devices, with the spacing being independent of the pitch of the mold cavities on the blow path, and to be able to blow a plurality of parisons on the blow path at the same time, the present device includes a straight heating path (1) and at least one straight blow path (7), and that the transportation device (2) for receiving parisons in close pitch comprises arms (4) which laterally project in such a manner that the deflection radius (r) of the transportation device (2) of the heating path (1) is smaller than the deflection radius (R) of the mandrel type receiving means, and that at least one transfer device (11) is interposed between a deflection portion of the heating path (1) and the portion of the blow path (7) which faces the deflection portion, and is controlled in such a manner that it grips the parisons and puts them on the blow path when the parisons on the deflection portion of the heating path (1) are spaced apart from one another at a distance corresponding to the spacing of the blow mold cavities on the blow path (7).

7 Claims, 2 Drawing Sheets

BLOW MOLDING MACHINE USING REHEAT METHOD FOR PRODUCING HOLLOW PLASTIC ARTICLES

BACKGROUND OF THE INVENTION

The present invention relates to the production of plastic hollow articles in a special type of blow molding process wherein parisons made in an injection molding process are taken from a supply device and heated on a heating path to blow temperature and are subsequently transferred into one or a plurality of blow molds in which they are blown to form hollow plastic articles of a shape and size predetermined by the mold cavity of the blow mold, subsequently cooled and then removed. Such a method in which cold parisons that have been removed from a supply device are again heated up to blow temperature is referred to as the "reheat method".

In order to heat the individual parisons evenly up to blow temperature over their entire length and over their entire cross-section, and since the heat penetrates through the cross-section only at a relatively slow pace, the parisons usually move on a long heating route along a straight or circular path on which spaced-apart heating units, typically infrared radiators, are arranged, the portions of the path between the heating units being so-called compensating or cooling sections in which the heat, which has externally been applied to the parisons, has enough time to penetrate through the cross-section. Moreover, these sections are provided to ensure that the external wall of the parison is not overheated, which happens quite often with many plastics that are sensitive with respect to the so-called process window.

Such a system does not normally present any difficulties in cases where only one parison is transferred into a blow mold one at a time after having passed through the heating path (e.g. EP 0 387 735 A1). By contrast, if parisons are to be transferred into a plurality of blow molds arranged on a special blow path so as to increase the output and thus enhance the economic efficiency of a reheat system, the difficulty arises that the parisons must move along the heating path in a relatively close pitch for an efficient exploitation of the radiation emitted, while the pitch or spacing of the cavities of the blow molds has to be adapted to the volume of the blown hollow articles and thus to the size of the blow molds with their cavities or mold cavities and cooling channels. In other words, the parisons must pass along the heating path in relatively close pitch, whereas the blow mold cavities must be accommodated on the blow path in wider pitch in comparison therewith.

DE 31 30 129 A1 describes this problem and suggests, as the solution, a heating wheel which rotates between heating boxes fixedly arranged on the outer circumference with a close pitch for the parisons or the retaining mandrels receiving said parisons, from which wheel they are transferred by a transfer wheel to a blow wheel on which the blow molds are arranged in a pitch adapted to the size of said molds. As for the suggestion made in DE 31 30 129 A1, a transfer is possible for the reason that at the beginning not each of the retaining mandrels is equipped with a parison from the supply device, but only e.g. the first, third, fifth, seventh mandrel and then after a complete rotation of the heating wheel every second, forth, sixth, eighth . . . retaining mandrel, and a parison is transferred accordingly into a blow mold only after two rotations. Since a new parison is simultaneously put onto every position on the heating wheel that has become free due to transfer to the blow wheel, with the parison being transferred into a blow mold on the blow wheel after two rotations, the machine operates continuously. Since it is only every second parison that is transferred from the heating wheel to the blow wheel in continuous sequence, the pitch on the blow wheel can be twice as great as that on the heating wheel. Of course, in this method every parison can pass through the heating path three times before being transferred to the blow wheel, and the blow mold pitch can be chosen accordingly.

This method, however, has, the disadvantage that in this system also only one blow mold including a cavity can be filled with a parison one at a time and also that every parison has to pass through two rotations of the heating wheel before being removed from the heating wheel and transferred to the blow wheel, with the effect that the heating path consists of two equal sections, so that, as far as a heating operation up to the blow temperature is concerned, there is no possibility of adaptively changing the heating conditions and the compensating and/or cooling sections between the heating devices during the second run in comparison with the first run.

Moreover, a machine which operates in accordance with this known system requires noticeably more space for the same output.

It is therefore the object of the present invention to provide a reheat type blow molding machine in which it is not only possible to guide the parisons in close pitch on the heating path past the heating sections and the interposed compensating and/or cooling sections, while the blow mold or blow mold cavity pitch on the blow path is independent of the pitch of the parisons on the heating path, but with which a plurality of blow molds on the blow path or one or a plurality of blow molds with a plurality of blow cavities can simultaneously be equipped with parisons which can simultaneously be blown to form hollow plastic articles.

DETAILED DESCRIPTION

Figure 1:
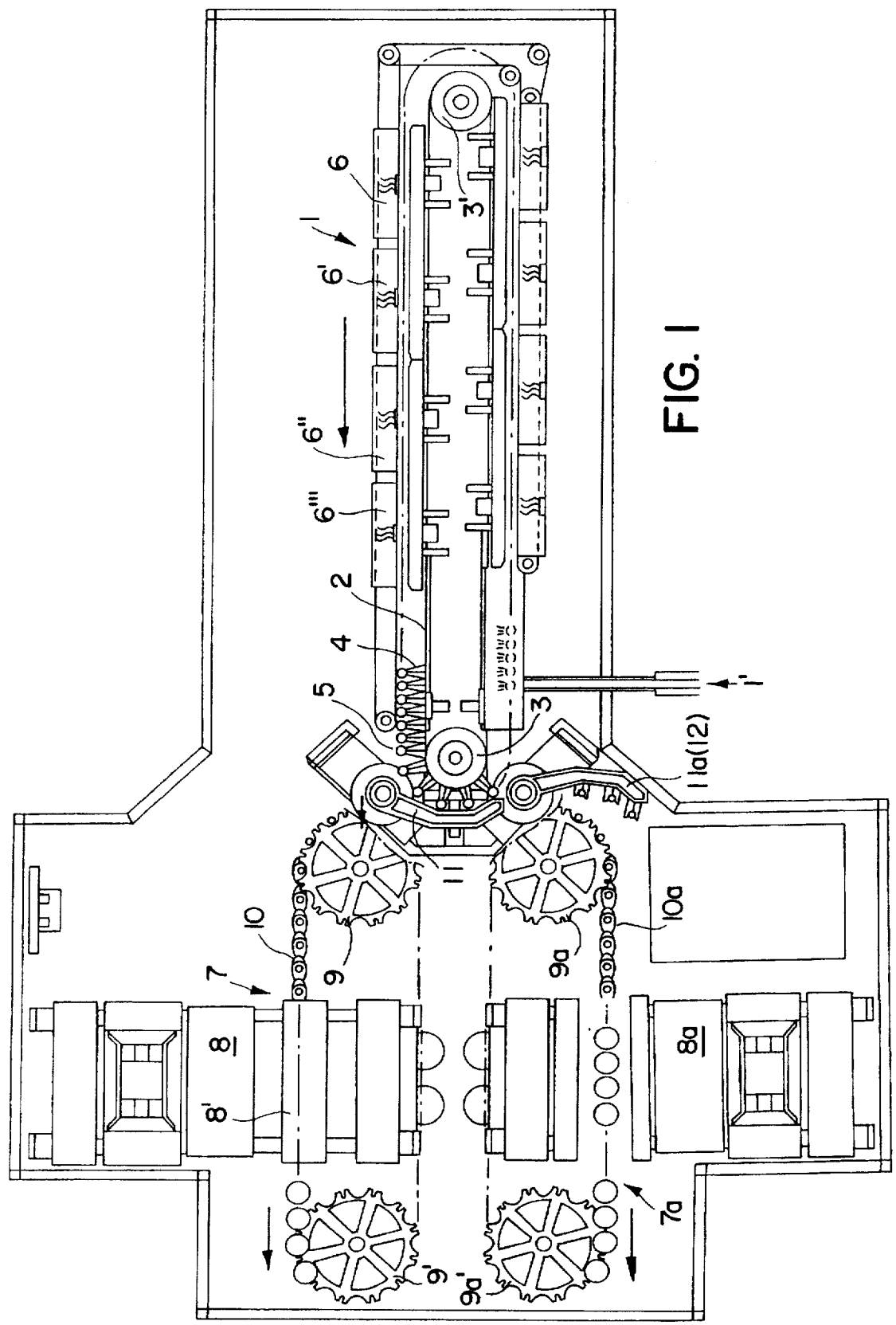
FIG. 1 is a partial view on a blow molding machine according to the invention, where some devices that do not pertain to the invention, for instance gearing and control cabinets, have been omitted.

The numeral 1 generally designates a heating path on which an endless conveyor device, such as a chain 2, runs over deflection pulleys 3, 3'. Chain 2 carries outwardly projecting arms 4, of which only a few have been shown. The ends of arms 4 are formed as parison mountings, e.g. in the form of retaining mandrels which are put into rotation during the advance movement. A parison taken from a supply device 1' can be attached onto each of retaining mandrels 5, 6, 6', 6" ... 6n designate heating means arranged in spaced-apart relationship along the heating path, for instance, infrared radiators whose radiation will externally heat the parisons which have been attached onto mandrels 5. The drawing just shows heating means arranged along a side of the conveyor device 2, but these means may also be positioned next to the advance run and the return run of chain 2 in the illustration.

Each heating path has associated therewith at least one blow path generally designated by 7, on which in the illustrated case a blow means 8 is arranged with a blow mold 8' having e.g. four respective mold cavities. A blow path 7 further includes a chain 10 which rotates around deflection chain wheels 9, 9' in the direction of the arrow and from which the blown hollow plastic articles are removed. In the case of the illustrated machine a heating path 1 operates along two blow paths 7, 7a, the last-mentioned blow path being equipped with a blow means 8a, which is identical with blow means 8, and with deflection pulleys 9a, 9a' and a chain 10a running around pulleys 9a, 9a'.

Figure 2:
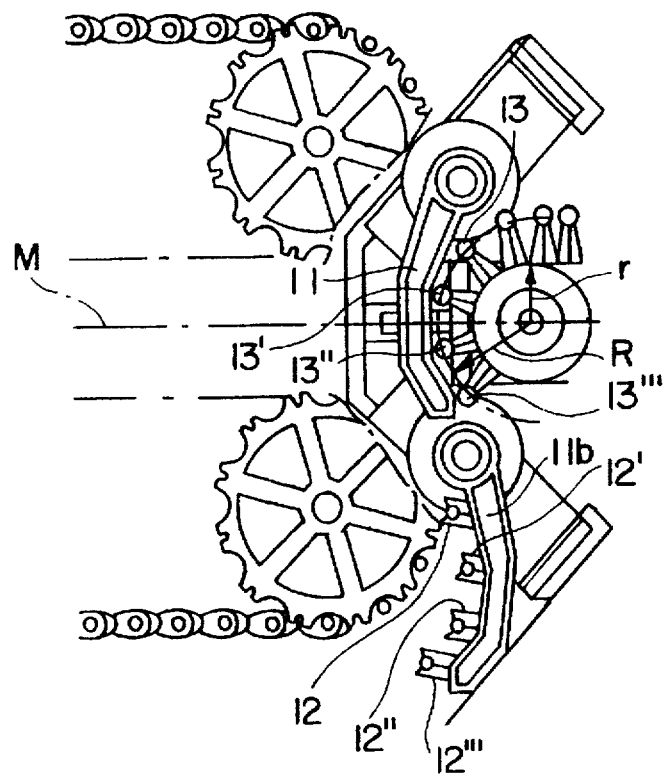
FIG. 2 shows a section taken from FIG. 1 on an enlarged scale in comparison with FIG. 1.

Transfer devices 11, 11a which in controlled fashion remove the parisons which have been heated to blow temperature from the deflection portion of the heating path and put them on chain 10 of the blow path or chains 10, 10a of blow paths 7, 7a are interposed between the end of the heating path 1 at the left side in the drawing and the beginning of the blow paths 7, 7a at the right side in the drawing, i.e. between deflection pulley 3 of heating path 1 and deflection pulleys 9, 9a of blow path 7, illustrated on an enlarged scale in FIG. 2. These transfer devices 11, 11a are of such a structure that on the heating path they grip a plurality, according to the illustration, for example, a set of four parisons at the same time, remove them from their retaining mandrels and pivot them over chains 10, 10a of the blow path(s). To this end, the illustrated lever-shaped transfer devices 11 may e.g. have provided thereon grippers 12 which operate mechanically or pneumatically (negative pressure).

As shown in the drawings, the one transfer device, e.g. transfer device 11, grips with its grippers, e.g. grippers 12, 12', 12", 12"', a set of several parisons, e.g. four parisons 13, 13', 13" , 13"', whenever said parisons are equally spaced apart in the deflection position on deflection pulley 3 of heating path 1. In this position, i.e. when the conveyor device 2 is deflected by the deflection pulley 3, the pitch between the parisons 13 and their retaining mandrels, respectively, becomes greater because the conveyor-device deflection radius r of pulley 3 is smaller than the radius R which is described by the circular arc through the center axes of the parisons attached onto the ends of arms 4. This means that as soon as the predetermined number of parisons on their arms 4 have reached the deflection pulley and all, e.g. four parisons at a time, occupy an angle equally divided by the center plane M on the deflection pulley 3, the parisons will be transferred from the heating path onto the blow path if the length of arms 4 and thus the deflection radius of the parisons are dimensioned such that, when the take-over position has been reached, the distance between the parisons is equal to the pitch of the molds of mold cavities in the blow mold or blow molds.

The conveyor device 2 is expediently moved cyclicly in the direction of the arrow, i.e. each advance movement is followed by a standstill period. Advance and standstill periods on the heating path may, for instance, amount to 0.2 s each.

Thus, the parisons are removed by the transfer device 11 in spaced-apart relationship from the conveyor device 2 and are transferred to the chain 10 of blow path 7, the spacing of said parisons corresponding to the one of the blow mold cavities in one or a plurality of blow molds that are arranged side by side.

The conveyor device of the blow path, e.g. chain 10, is also moved in timed fashion, and the parisons are transferred from the conveyor device 2 to the conveyor device 10 whenever the two devices have a standstill period at the same time or almost at the same time. The advance and standstill periods of chain 10, however, can be varied within certain limits, since they are independent of those of the heating path, and can be adapted to the blow cycle time, i.e. the time needed for feeding a blow mold with one or a plurality of parisons until the removal of the hollow plastic articles blown. There is enough time for such an operation because after each gripping of e.g. four parisons at an advance and standstill time of 0.2 s each, an advance time of 0.2 s×4+a standstill time of 0.2 s×4=a period of 1.6 s will pass on the heating path until there are again four parisons to be gripped on the portion of the deflection pulley 3 for removal purposes and for the pivotal movement of the transfer devices which, of course, also needs some time, though a short one. This ratio will be further improved in favor of a longer time interval for gripping the parisons and for transferring and processing said parisons in the blow path if, in accordance with the illustration, a heating path 1 operates on two blow paths 7, 7a, because in such a case the transfer device 11, for instance, will not grip the next four parisons which have been precycled for deflection after the parisons have been transferred to chain 10, but only those four parisons following the next ones; the above-mentioned parisons which have been precycled after the transfer are gripped by the transfer device 11a and moved onto blow path 7a.

Figure 3:
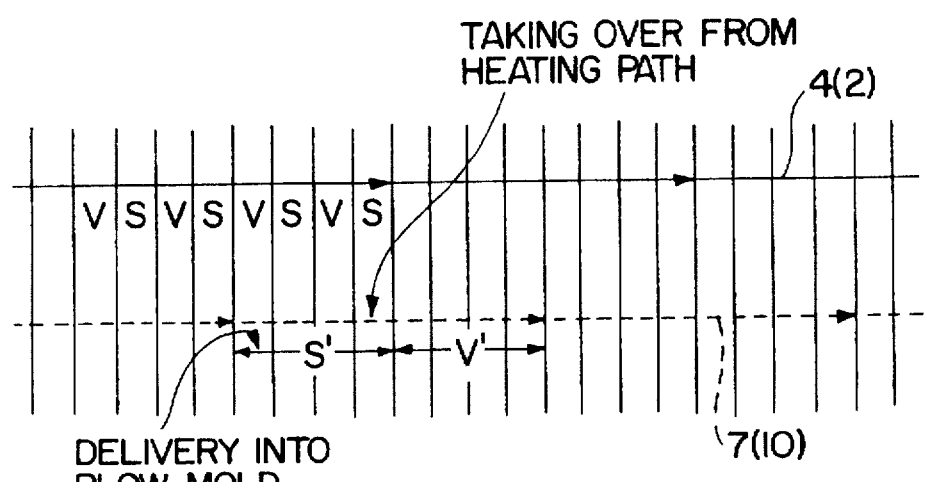
FIG. 3 shows a cycle time diagram.

Hence, in the illustrated embodiment the cycle ratio will be 4:1 if a cycle consists of an advance time and a standstill time. This means that one cycle is passed on the blow path at the same time at which four cycles are passed on the heating path 1. An attempt is made in the diagram of FIG. 3 to explain this process; it is here assumed, but not imperative, that a cycle is also divided on the blow path into two sections of equal length, namely advance time and standstill time. As can be seen, on the heating path 1, four cycles that consist of advance (V) and standstill (S) are needed to bring four parisons on the deflection portion into the position required for a transfer onto the blow path. It is important that the standstill (S) of the conveyor device 2 of the heating path 1 and the standstill (S') of the chain 10 of the blow path 7 overlap to such an extent that both devices have a standstill period at the same time, the standstill period of chain 10, however, being possibly longer than that of conveyor device 2. During the standstill period of chain 10, it is not only the parisons already positioned on the heating path, in the illustrated case four parisons, that are removed from said path and put on chain 10, but four parisons that are positioned between the opened blow mold parts are gripped by the closing mold, blown, cooled and then removed from the mold as blown hollow articles. It would even be possible to cyclicly move the conveyor device 2 of heating path 1 onwards after a transfer device has been lifted, i.e. even before the parisons have been put on the conveyor device 10 or 10a of blow path 7, 7a. Thereupon, an advance movement (V) of four parisons takes place on the blow path between or towards the blow mold halves, which were opened in the meantime, and the timing cycle begins anew. The difference is that in the straight section of the heating path the parisons which pass through the heating devices in close pitch have been given, on the deflection portion, a greater spacing from one another which corresponds to the spacing of the mold cavities on the blow path, while the parisons on said blow path do not change their spacing, but maintain it, since in the case of the heating path the deflection radius of the conveyor device 2 is smaller than the radius described by the parisons on arms 4, while on the blow path the deflection radius is equal to the one described by the parisons carried by chain 10. If according to the illustration in FIG. 1 a heating path serves two blow paths, the parisons are transferred from the heating path 1 to the blow path 7 not during the standstill period of the eighth cycle, but only during that of the twelfth cycle on the deflection path, i.e. twice the amount of time is available for the advance movement and the transfer of the parisons into the mold cavities and for the blowing and cooling operations.

As can be seen, this system is very flexible because, especially on the blow path, a cycle need not consist of advance and standstill times of the same length. To gain time for thick-walled hollow plastic articles for blowing and cooling operations in the blow mold, it is possible to interpose a so-called urgent advance between two standstill times, to prolong the standstill times, and it is equally possible to prolong the advance time accordingly, in order to gain a longer cooling or compensating time for the parisons transferred to the blow path prior to their introduction into the blow mold. As is generally known, the reheat method has certain difficulties in evenly distributing the heat, which has been applied to the surface of the parisons from the outside, across the entire cross-section of the parisons down to the inner wall, which is quite easily accomplished when the heat has enough time to propagate across the cross-section evenly.

Moreover, the machine according to the invention is flexible with respect to the number and arrangement of the blow molds and the size of the mold cavities, especially when a heating path serves two blow paths. For instance, it is possible, of course within certain limits, to produce smaller plastic hollow articles of a greater wall thickness on one blow path and correspondingly greater and thus thinner-walled hollow plastic articles on the second blow path from the same parisons that have been heated on the heating path.

We claim:

1. A blow molding machine using the reheat method for producing hollow plastic articles, comprising a heating path for heating cold parisons taken from a supply device, from which path, after having been heated, they are transferred to a blow path at a greater spacing from one another, which corresponds to the spacing of the blow mold cavities, than on the heating path, on which blow path they are introduced into one or a plurality of blow molds and in which blow molds they are blown to form hollow plastic articles of a desired shape, are then cooled and taken from said molds for the accommodation of new parisons, wherein said heating and blow paths (1,7) include straight transportation devices (2,10) guided around deflection devices (3,9) for said parisons, and that at least along one side of said transportation device (2) heating means (6) are arranged and along one side of said transportation device (10) at least one blow mold (8) is arranged, that said transportation device (2) of said heating path (1) includes arms (4) having mandrel receiving means (5) for receiving said parisons in close pitch, which arms (4) laterally project in such a manner that the deflection radius (r) of said transportation device (2) is smaller than the deflection radius (R) of the mandrel receiving means (5) on said arms (4), and that for a removal from said heating path and a transfer to said blow path of a plurality of successive parisons at a time, a transfer device (11) is interposed between a deflection portion of said heating path and the section of said blow path (7) that faces said deflection portion, and is controlled such that the transfer device (11) grips said parisons and puts them on said blow path whenever on the deflection portion of said heating path said parisons have a spacing corresponding to the spacing of said blow mold cavities on said blow path.

2. A blow molding machine according to claim 1, wherein a control means moves said parisons on said heating path (1) and said blow path (7) in cycles which respectively consist of advance and standstill periods (V and S, respectively), and wherein removal from said heating path and transfer to said blow path take place during a standstill period (S) in which a plurality of parisons are positioned on the deflection path of said heating path at equal distances and said conveyor device (10) is simultaneously at a standstill on said blow path in the position in which said parisons are received.

3. A blow molding machine according to claim 1, wherein a control means by which at each cycle of said heating path all parisons are advanced by said transportation device (2) by the same amount, but at each cycle of said blow path only so many parisons are advanced by said transportation device (10) as have simultaneously been transferred from said heating path to said blow path.

4. A blow molding machine according to claim 1, wherein both sides of the extension of a center plane (M) through said heating path two blow paths (7, 7a) are provided with one respective transportation device (10, 10a) and with one respectively assigned transfer device (11, 11a).

5. A blow molding machine according to claim 4, wherein said transportation devices (10, 10a) rotate in the same direction.

6. A blow molding machine according to claims 5, wherein a control means by which each of said transfer devices (11, 11a) receives from said deflection portion, every second set of parisons which are ready to be taken over on said deflection portion of said heating path (1) and transfers said set to said conveyor device (10, 10a) and said blow path (7, 7a).

7. A blow molding machine according to claim 1, wherein the length of said arms (4) which laterally project from said conveyor device (2) of said heating path (1) and the spacing of said mandrel receiving means (5) from said conveyor device (2) are defined by the distance of said mold cavities on said blow path (7,7a).

* * * * *